(12) United States Patent
Betts et al.

(10) Patent No.: US 7,860,924 B2
(45) Date of Patent: Dec. 28, 2010

(54) METHOD AND SYSTEM FOR SUPPORTING MULTIPLE VERSIONS OF WEB SERVICES STANDARDS

(75) Inventors: Christopher Betts, Mount Dandenong (AU); Tony Rogers, Rowville (AU)

(73) Assignee: Computer Associates Think, Inc., Islandia, NY (US)

( * ) Notice: Subject to any disclaimer, the term of this patent is extended or adjusted under 35 U.S.C. 154(b) by 895 days.

(21) Appl. No.: 11/132,633

(22) Filed: May 19, 2005

(65) Prior Publication Data

US 2006/0004722 A1    Jan. 5, 2006

Related U.S. Application Data

(60) Provisional application No. 60/573,542, filed on May 21, 2004, provisional application No. 60/573,597, filed on May 21, 2004.

(51) Int. Cl.
*G06F 15/16* (2006.01)
*G06F 17/30* (2006.01)

(52) U.S. Cl. ............... 709/203; 709/1; 707/999.003

(58) Field of Classification Search ........... 709/201, 709/203; 707/3
See application file for complete search history.

(56) References Cited

U.S. PATENT DOCUMENTS

| | | | |
|---|---|---|---|
| 4,558,413 A | 12/1985 | Schmidt | |
| 5,675,802 A | 10/1997 | Allen | |
| 5,721,919 A | 2/1998 | Morel | |
| 5,930,794 A | 7/1999 | Linenbach | |
| 6,112,024 A | 8/2000 | Almond et al. | |
| 6,279,003 B1 * | 8/2001 | Lee et al. | 707/100 |
| 6,301,592 B1 | 10/2001 | Aoyama | |
| 6,480,865 B1 | 11/2002 | Lee | |
| 6,502,112 B1 | 12/2002 | Baisley | |
| 6,560,616 B1 | 5/2003 | Garber | |
| 6,560,620 B1 | 5/2003 | Ching | |
| 6,658,626 B1 | 12/2003 | Aiken | |

(Continued)

FOREIGN PATENT DOCUMENTS

CA    2 255 047 A1    5/2000

(Continued)

OTHER PUBLICATIONS

Senivongse T, Enabling Flexible Cross-Version Interoperability for Distributed Services, Sep. 1999, IEEE Comput. Soc, Proceedings of the International Symposium on Distributed Objects and Applications, p. 201-10.*

(Continued)

*Primary Examiner*—William C Vaughn, Jr.
*Assistant Examiner*—Carlos R Perez Toro
(74) *Attorney, Agent, or Firm*—Baker Botts L.L.P.

(57) ABSTRACT

Methods and apparatuses for supporting multiple versions of web services standards are provided. A data handler receives a data entry in a version of a web services standard older than a most current version of the web services standard. A converter converts the data entry in the older version received by the data handler to conform to the most current version of the web services standard. The data entry converted by the converter to conform to the most current version of the web services standard is stored as a data object in a repository.

29 Claims, 4 Drawing Sheets

U.S. PATENT DOCUMENTS

| | | | |
|---|---|---|---|
| 6,675,353 | B1 | 1/2004 | Friedman |
| 6,831,668 | B2 | 12/2004 | Cras |
| 6,848,078 | B1 | 1/2005 | Birsan |
| 6,859,810 | B2 | 2/2005 | Andrei |
| 6,895,364 | B2 | 5/2005 | Banfer |
| 6,904,562 | B1 | 6/2005 | Hind |
| 6,938,029 | B1 | 8/2005 | Tien |
| 6,961,732 | B2 | 11/2005 | Hellemann |
| 6,961,760 | B2* | 11/2005 | Li et al. .............. 709/219 |
| 7,096,421 | B2 | 8/2006 | Lou |
| 7,107,298 | B2 | 9/2006 | Prahlad |
| 7,120,652 | B2 | 10/2006 | Maslowski |
| 7,162,501 | B2 | 1/2007 | Kupkova |
| 7,284,190 | B2 | 10/2007 | Chellis |
| 7,302,444 | B1 | 11/2007 | Dunmore |
| 7,356,779 | B2 | 4/2008 | Cras |
| 7,370,118 | B2* | 5/2008 | Tan et al. .............. 709/238 |
| 7,392,471 | B1 | 6/2008 | Ford |
| 7,437,664 | B2 | 10/2008 | Borson |
| 2002/0184252 | A1 | 12/2002 | Holtz |
| 2003/0074401 | A1* | 4/2003 | Connell et al. .............. 709/203 |
| 2003/0084424 | A1 | 5/2003 | Reddy |
| 2003/0101164 | A1 | 5/2003 | Pic |
| 2003/0177442 | A1 | 9/2003 | Lou |
| 2003/0237047 | A1 | 12/2003 | Borson |
| 2004/0025117 | A1 | 2/2004 | Ingersoll et al. |
| 2004/0068586 | A1 | 4/2004 | Xie et al. |
| 2004/0117412 | A1 | 6/2004 | Tran |
| 2004/0205509 | A1 | 10/2004 | Lou |
| 2004/0210599 | A1 | 10/2004 | Friedman |
| 2005/0039117 | A1 | 2/2005 | Lou |
| 2005/0053091 | A1* | 3/2005 | Lee .............. 370/466 |
| 2005/0060140 | A1 | 3/2005 | Maddox |
| 2005/0060645 | A1 | 3/2005 | Raghavachari |
| 2005/0144598 | A1 | 6/2005 | Sabadell |
| 2005/0192990 | A1 | 9/2005 | Kharitidi et al. |
| 2005/0235009 | A1* | 10/2005 | Purdy et al. .............. 707/203 |
| 2006/0015807 | A1 | 1/2006 | Chellis |
| 2006/0136814 | A1 | 6/2006 | Spada |

FOREIGN PATENT DOCUMENTS

| | | |
|---|---|---|
| WO | WO 03/077156 A1 | 9/2003 |
| WO | WO 03/077558 A2 | 9/2003 |
| WO | WO 2004/019231 A2 | 3/2004 |

OTHER PUBLICATIONS

UDDI.ORG: "*UDDI Technical White Paper*", vol. 1, XP 00230398 (13 pages), Sep. 6, 2000.

Notification of Transmittal of the International Search Report and the Written Opinion of the International Searching Authority for International Application No. PCT/US2005/017781, filed May 19, 2005 (12 pages), Sep. 19, 2005.

Notification of Transmittal of the International Search Report and the Written Opinion of the International Searching Authority for International Application No. PCT/US2005/017788, filed May 19, 2005, (6 pages), Sep. 19, 2005.

USPTO Office Action, U.S. Appl. No. 11/070,809, filed Mar. 2, 2005, inventor Bhatia, 14 pages, Aug. 18, 2009.

USPTO Advisory Action, U.S. Appl. No. 11/088,700, filed Mar. 24, 2005, inventor Bhatia, 3 pages, Sep. 3, 2009.

Chang, George J.S.; Patel, Girish; Relihan, Liam; and Wang, Jason T. L., "A Graphical Environment for Change Detection in Structured Documents", XP 10247357A, 1997 IEEE, pp. 536-541, 1997.

UDDI.ORG: "UDDI Technical White Paper", vol. 1, XP 00230398 (13 pages), Sep. 6, 2000.

Mit, Inria, Keio; "W3C—Document Object Model (DOM) Level 1 Specification"; XP007901240; pp. 1-90, Sep. 29, 2000.

Mit, Inria, Keio; "2.5.5. Object Definitions"; XP007901240; pp. 91-180, Sep. 29, 2000.

Mit, Inria, Keio; "D2: Document Object Model Level 1 HTML" XP007901240; pp. 181-212, Sep. 29, 2000.

Microsoft Computer Dictionary, Microsoft, 5th Ed., 4 pages, May 1, 2002.

Wang, Yuan; DeWitt, David J.: and Cai, Jin-Yi, "X-Diff: An Effective Change Detection Algorithm for XML Documents", XP 10678765A, 2003 IEEE, pp. 519-530, 2003.

"Rational Clear Case Command Reference," XP002387958, pp. 492-497, Jun. 2003.

"Customizing ClearCase Reports," IP Notices, IBM Software, pp. 1-33, May 13, 2003.

Rahm, "Matching Large XML Schemas," vol. 33, Dec. 2004.

Notification of Transmittal of The International Search Report and The Written Opinion for International Application No. PCT/US2006/010601, 12 pgs, Nov. 2, 2006.

Rational; "Rational ClearCase Command Reference (A-L"; URL:http://www.elink.ibmlink.ibm.com/public/applications/publications/cgibin/pbi.cgi?CTY=US&FNC=SRX&PBL=G126-5328-00; Xp-002387958; 8 pages, Jun. 29, 2006.

PCT Notification of Transmittal of the International Search Report and the Written Opinion of the International Searching Authority, or the Declaration, for International Application No. PCT/US2006/007673, 10 pages, Jul. 13, 2006.

"IBM Rational ClearCase," wikipedia, pp. 1-6, Apr. 15, 2008.

USPTO Office Action, U.S. Appl. No. 11/070,809, Inventor, 12 pages, Oct. 11, 2007.

USPTO Office Action, U.S. Appl. No. 11/070,809, Inventor, 15 pages, Apr. 30, 2008.

USPTO Office Action, U.S. Appl. No. 11/070,809, Inventor, 13 pages, Sep. 19, 2008.

USPTO Office Action, U.S. Appl. No. 11/070,809, Inventor, 16 pages, Mar. 6, 2009.

USPTO Office Action, U.S. Appl. No. 11/088,700, Inventor Bhatia, 18 pages, Aug. 9, 2007.

USPTO Office Action, U.S. Appl. No. 11/088,700, Inventor Bhatia, 22 pages, Jan. 25, 2008.

USPTO Office Action, U.S. Appl. No. 11/088,700, Inventor Bhatia, 26 pages, Dec. 17, 2008.

USPTO Office Action, U.S. Appl. No. 11/088,700, Inventor Bhatia, 23 pages, May 20, 2009.

\* cited by examiner

METHOD AND SYSTEM FOR SUPPORTING MULTIPLE VERSIONS OF WEB SERVICES STANDARDS

CROSS REFERENCE TO RELATED APPLICATIONS

The present application claims the benefit of U.S. provisional application Ser. No. 60/573,542, filed May 21, 2004 and entitled "SIMULTANEOUS SUPPORT OF MULTIPLE UDDI VERSIONS", and U.S. provisional application Ser. No. 60/573,597, filed May 21, 2004 and entitled "METHOD AND APPARATUS FOR SUPPORTING MULTIPLE VERSIONS OF A WEB SERVICES PROTOCOL".

TECHNICAL FIELD

The present disclosure relates to web services and, more specifically, to supporting multiple versions of web services standards.

DESCRIPTION OF THE RELATED ART

Computer systems are commonly used by enterprises and other organizations to store and manage information (in many instances, confidential and/or sensitive information). Constituents of the enterprises and organizations often have around-the-clock access to the stored information through the use of websites and related web-based services. Computer systems as referred to herein can include individual computers, servers, computing resources, networks, etc.

Web services present a new way for computer to communicate with each other. Web services are software systems that can be identified by Universal Resource Identifiers (URI), analogous to identification of websites by Uniform Resource Locator (URL). Web services generally contain public interfaces and bindings that enable other software systems (such as other web services) to use its functionality seamlessly. In this way, web services enhance the way computers communicate with each other, and therefore are transforming the way modern enterprises interact and share information.

Some cross-platform programming languages have been developed to facilitate communication between various different computer systems. A popular example of one such programming language is Extensible Markup Language (XML). Many web services interact with one another using XML which is a human readable format. In addition, web services are also used in non-English environments through the use of Unicode which is a universal language code.

Users (for example, individuals and software systems) seeking to access a web service must generally locate and connect to the web service. The process of locating and connecting to a web service is commonly known as discovery and integration. Universal Description, Discovery and Integration (UDDI) standards have been adopted to facilitate discovery and integration.

Users can use repositories employing UDDI standards to find the location of web services, in a manner similar to looking for businesses in a yellow pages phone book. UDDI repositories may also describe the functionality of listed web services utilizing a standardized vocabulary. UDDI repositories are generally provided as directories in which information pertaining to an enterprise, its services, technical information, and information about specifications for the enterprise's web services (for example, web service URIs) can be looked up.

The UDDI standards have been modified several times since its inception. However, not every user has immediately adapted to the latest standards as they are released. This results in users using multiple different versions of UDDI standards.

The various versions of UDDI standards differ in a number of ways. Some of these differences give rise to incompatibilities. Incompatibilities threaten the usefulness of web services since web services rely on the seamless compatibility across multiple platforms.

When information is saved in a UDDI repository, a UDDI registry may assign unique identifier keys to the saved data which can then be used to access the specific data instances on demand. The keys can be used as unique identifiers for the corresponding data objects in the UDDI repository. UDDI data objects may refer to each other using the keys. In this way, the keys provide a location function for UDDI data objects.

The various versions of UDDI standards may have different methods for generating unique identifier keys. This distinction can create incompatibilities in the way UDDI repositories process and send data objects.

For example, UDDI Version 2 keys are generally Universal Unique Identifiers (UUID). A UUID is generally a hexadecimal string that has been generated according to a very exacting algorithm that prevents the generation of duplicate UUIDs. An example of a UUID is 5a389ad2-22dd-11d1-aa77-002035b29092.

UDDI Version 3 uses keys which are generally URI keys may be chosen by a user and may be descriptive and meaningful in a similar way to URLs. An example of a Version 3 key is uddi:acme.com:my_web_service.

It may sometimes be possible to convert keys between UDDI versions. For example, algorithms exist that can convert a Version 3 key to a unique Version 2 key. One example of such an algorithm can be found in UDDI Version 3, published specification dated Jul. 19, 2002, paragraph 10.1.1.

However, algorithms used to convert Version 3 keys to Version 2 keys are often irreversible. It is not always possible to convert a Version 2 key back to the Version 3 key which was used to generate the Version 2 key.

In some situations, it is possible to use a map to keep track of the predefined Version 2 keys corresponding to predefined Version 3 keys (and vice versa). However, maps are not effective where keys are not predefined, or are otherwise unknown.

There is a need for a server that can simultaneously support multiple versions of UDDI standards.

SUMMARY

This application describes methods and apparatuses for supporting multiple versions of web services standards.

A method for supporting multiple versions of web services standards, according to an exemplary embodiment of this disclosure, comprises receiving a data entry in a version of a web services standard older other than a most current version of the web services standard, converting the data entry in the older version to conform to the most current version of the web services standard, and storing the data entry, converted to conform to the most current version of the web services standard, as a data object in a repository.

According to another exemplary embodiment, a method for supporting multiple versions of web services standards includes receiving a request conforming to a version of a web services standard older than a most current version of the web services standard, converting the request to the most current version, searching a repository in accordance with the converted request, converting a result of the search to conform to the older version, and generating a response to the received request based on the converted result.

An apparatus for supporting multiple versions of web services standards, according to an exemplary embodiment of this disclosure, includes a data handler and a converter. The data handler is configured to receive a data entry in a version of a web services standard older than a most current version of the web services standard. The converter is configured to convert the data entry in the older version received by the data handler to conform to the most current version of the web services standard. The converted data entry is stored as a data object in a repository.

According to another exemplary embodiment, an apparatus for supporting multiple versions of web services standards includes a repository, a request handler and a converter. The request handler is configured to receive a request conforming to a version of a web services standard older than a most current version of the web services standard, and generate a response in the older version to the request. The converter is configured to convert the request to the most current version, communicate the converted request to the repository, convert a search result from the repository in response to the converted request, to the older version, and communicate the converted search result to the request handler. The request handler uses the converted result to generate the response in the older version to the received request.

The methods and apparatuses of this disclosure may be embodied in one or more computer programs stored on a computer readable medium or program storage device and/or transmitted via a computer network or other transmission medium in one or more segments or packets.

BRIEF DESCRIPTION OF THE DRAWINGS

The features of the present application can be more readily understood from the following detailed description with reference to the accompanying drawings wherein.

DETAILED DESCRIPTION

The present disclosure provides tools (in the form of methodologies, apparatuses, and systems) for supporting multiple versions of web services standards.

A server for web services which is capable of handling more than one version of a web services standard can be used. For example, according to one exemplary embodiment, a server for web services can be adapted to be capable of handling UDDI Version 2 and UDDI Version 3. As described above, discovery and integration of web services may be aided by the use of a UDDI repository. UDDI repositories can contain one or more data objects. For example, a UDDI repository may contain one data object for each web service listed in the UDDI repository. Data objects within UDDI repositories can be called upon by referencing unique identifier keys. These unique identifier keys can also be used by the UDDI repository to allow for the discovery and integration of web services.

Repositories (for example UDDI repositories), according to exemplary embodiments of the present disclosure, can support multiple versions of a web services protocol or standard. The multiple versions of a web services protocol or standard may be, for example, multiple incremental versions of UDDI standards, for example UDDI Version 1, UDDI Version 2, etc. However, embodiments of the present disclosure are not limited to repositories that support multiple versions of UDDI standards. The multiple versions of a web services protocol or standard may refer to a set of standards or protocols that are not UDDI standards and/or not incremental improvements of one another.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
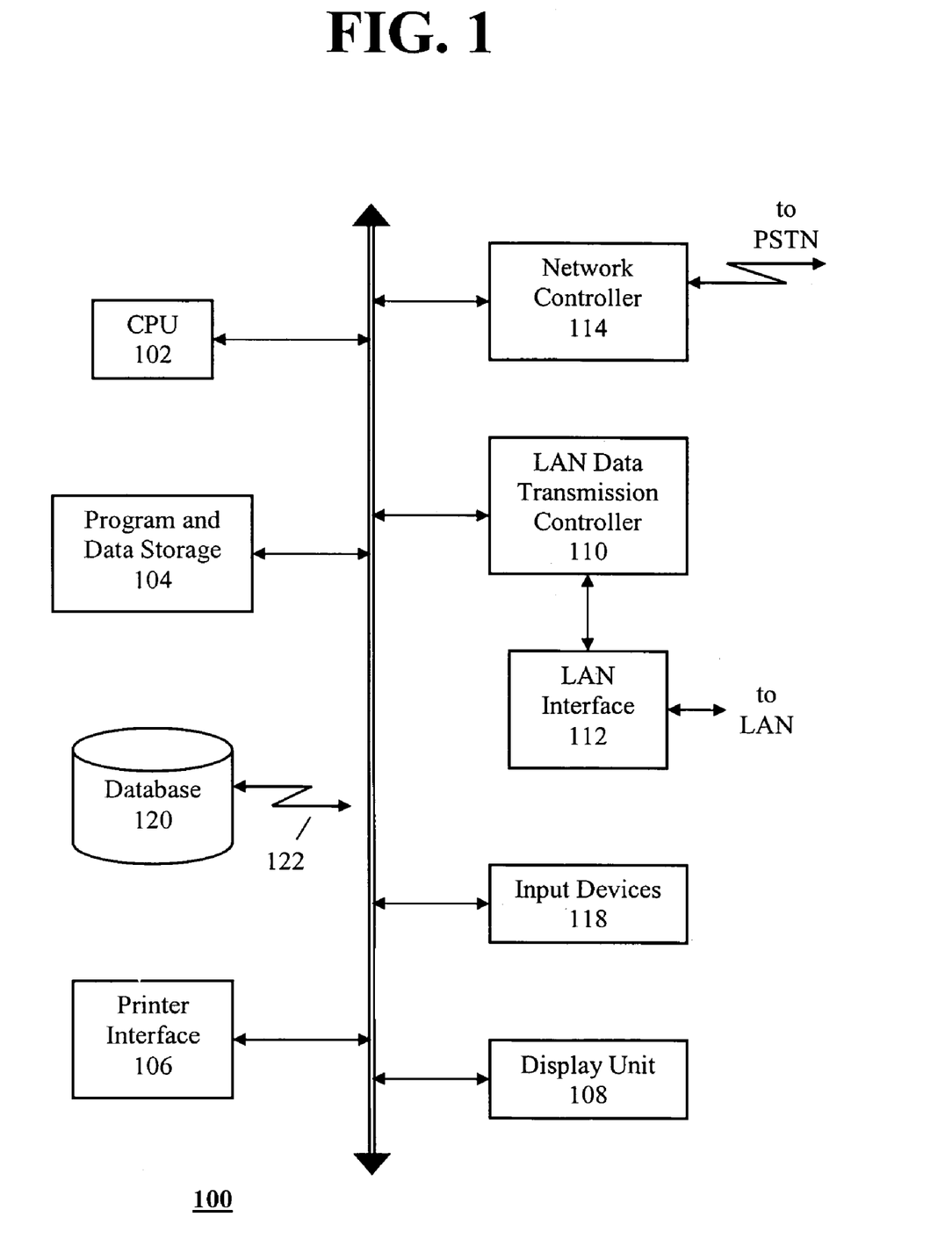
FIG. 1 is an example of a computer system capable of implementing the methods and apparatuses of this disclosure.

FIG. 1 shows an example of a computer system 100 which can implement the methods and apparatuses of the present disclosure. The apparatus and method of the present disclosure can be implemented in the form of a software application running on a computer system, for example, a mainframe, personal computer (PC), handheld computer, server, etc. The software application may be stored on computer readable media or program storage device locally accessible by the computer system, for example, floppy disk, optical disc, hard disk, etc., or may be remote from the computer system and accessible via a hard wired or wireless connection to a computer network (for example, a local area network, the Internet, etc.) or another transmission medium.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 can be connected to a database 120, via a link 122.

Figure 2A:
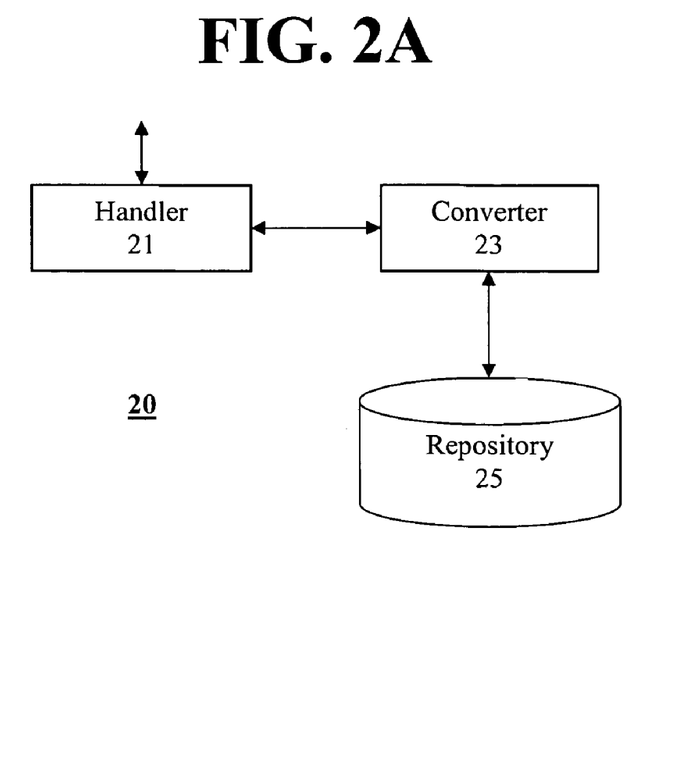
FIG. 2A is a block diagram corresponding to an apparatus for supporting multiple versions of a standard, according to an exemplary embodiment of this disclosure.
Figure 2B:
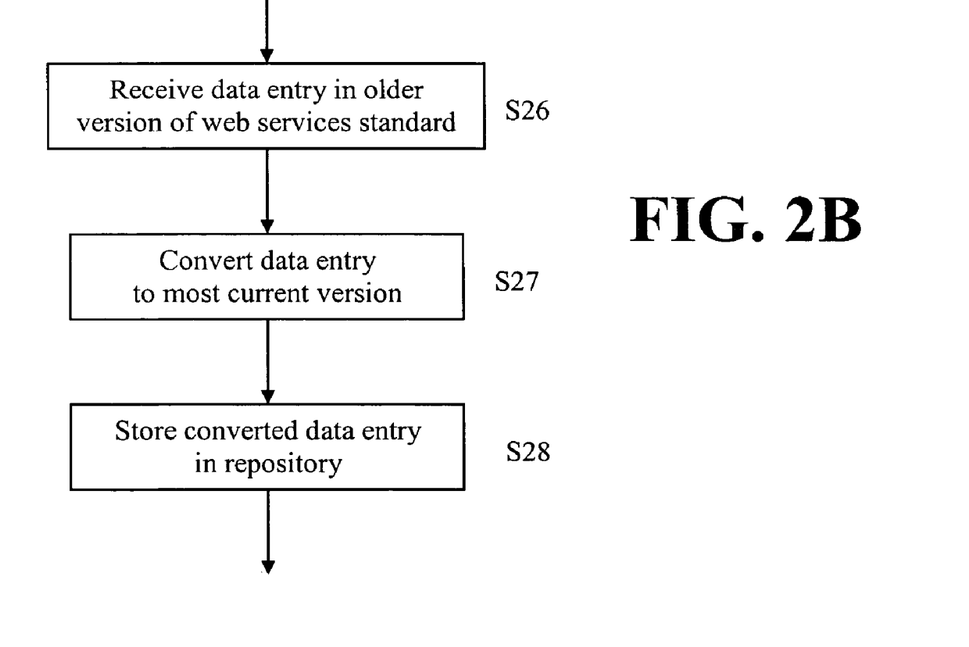
FIG. 2B is a flow chart corresponding to a method performed by the apparatus of FIG. 2A for supporting multiple versions of web services standards.

One exemplary embodiment of an apparatus and a method for supporting multiple versions of web services standards is discussed below with reference to FIGS. 2A and 2B. Apparatus 20 includes a handler 21, a converter 23 and a repository 25. The handler 21 receives a data entry in a version of a web services standard older than a most current version of the web services standard (step S26). The converter 23 converts the received data entry (in the older version) to conform to the most current version of the web services standard (step S27). The converted data entry is stored as a data object in the repository 25 (step S28). The data entry can be included in a request (for example, a publication request) conforming to the older version. The converter 23 converts data to be included in a response to the request from the most current version of the web services standard to the older version.

The data object stored in the repository 25 can include plural unique identifier keys for the data entry, and the unique identifier keys conform to respective versions of the web services standard. According to another embodiment, the data object can include one or more keys for a subordinate entry associated with the data entry, and the subordinate entry keys conform to respective versions of the web services standard. Further, the data object can optionally include a plurality of keys for an internal reference in the data entry, and the internal reference keys conform to respective versions of the web services standard.

The data handler 21 can receive a data request (for example, a find request) in a version of the web services standard other than the most current version, and the converter converts the data request to the most current version. The repository 25 is searched in response to the converted request, and the converter converts a result of the search to conform to the data request version.

Figure 3:
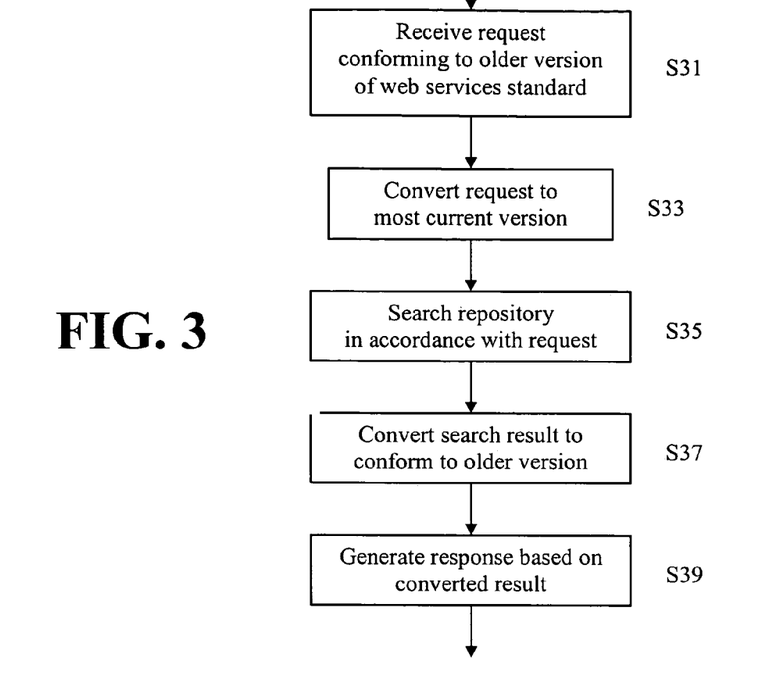
FIG. 3 is a flow chart corresponding to a method for supporting multiple versions of a web services standard, according to another exemplary embodiment.

Another exemplary embodiment of a method for supporting multiple versions of web services standards, is discussed below with reference to FIGS. 3 and 2B. A request conforming to a version of a web services standard older than a most current version of the web services standard is received through the handler 21 (step S31). The converter 23 converts the received request to the most current version (step S33). The repository 25 is searched in accordance with the converted request (step S35). The search result is converted by the converter 23 to conform to the older version (step S37). The handler 21 generates a response to the received request based on the converted result (step S39).

Figure 4:
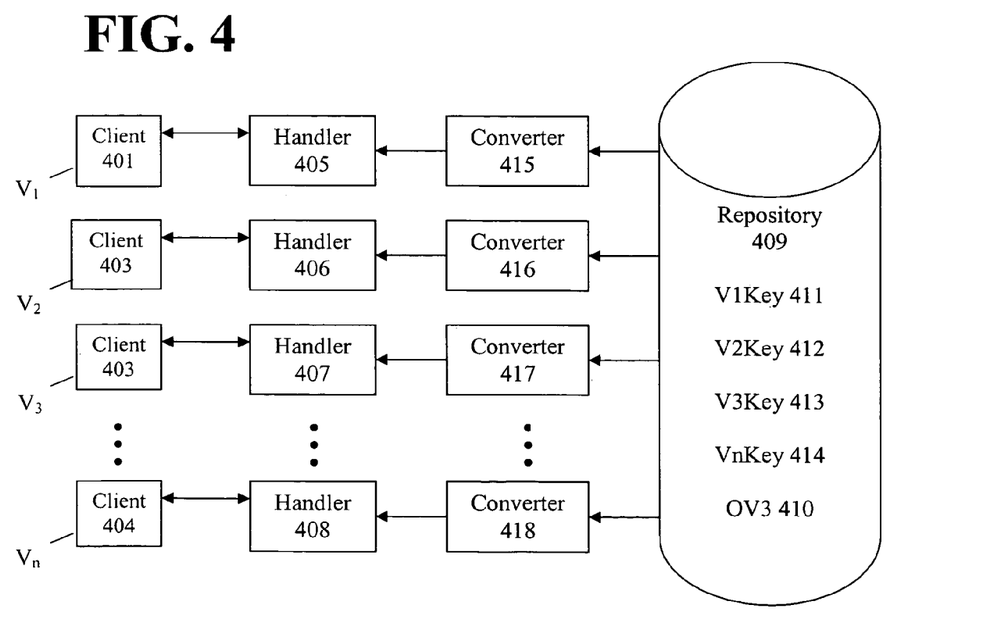
FIG. 4 is a schematic diagram illustrating an apparatus for supporting multiple versions of a standard, according to another exemplary embodiment.

FIG. 4 illustrates schematically an apparatus for supporting multiple versions of web services standards, according to an exemplary embodiment. A repository 409 is used as an example of a server that utilizes UDDI standards. However, any server may be equally capable of utilizing the present disclosure. The apparatus of this embodiment can handle more than one UDDI version. A client software system can access the data repository regardless of the UDDI version in use by the client. FIG. 4 shows four such clients each using a different UDDI version. The four clients are 401, 402, 403, 404, and they are using UDDI versions $V_1$, $V_2$, $V_3$ and a future version of UDDI (labeled $V_n$), respectively. The present disclosure can support any number of future UDDI versions.

Each client (401-404) can issue a request for information directed to the data repository 409 in the UDDI version supported by that client 401-404 sending the request. According to embodiments of the present disclosure, each request can be sent to a respective request handler 405-408. Multiple request handlers 405-408 may be used, preferably, one request handler 405-408 for each UDDI version supported by the data repository 409.

According to the exemplary embodiment shown in FIG. 4, four request handlers 405-408 may be used to support UDDI versions 1, 2, 3 and n respectively. The request handler 405 handles requests from clients 401 that utilize UDDI version 1, the request handler 406 handles requests from clients 402 that utilize UDDI version 2, the request handler 407 handles requests from clients 403 that utilize UDDI version 3, and the request handler 408 handles requests from clients 404 that utilize UDDI version n.

All of the requests to the UDDI server can be received on a single channel, and distributed to the appropriate handler for the version of the request. This is possible because each version of UDDI uses a different XML namespace. It is easy to identify the namespace on the incoming request and dispatch it to the handler appropriate to that version. This allows the UDDI server to offer a single channel to requesters, while still handling multiple versions of requests.

Data objects 410 of information can be stored in the data repository 409. Objects 410 are generally written according to the current UDDI version (in the example of FIG. 4, it is UDDI Version 3). Objects 410 can be associated with a unique identifier key for the version of the UDDI standard for which the object 410 has been written in, here a UDDI Version 3 key 413. The objects 410 typically is also associated with a unique identifier key for other supported UDDI versions. Here, the object 410 is also associated with a unique identifier key for UDDI Version 1 (411), Version 2 (412) and Version n (414).

Although not shown in FIG. 4, each data entry can include one or more subordinate entries that are related. Under such a circumstance, each key of a subordinate entry is likewise translated into multiple versions and saved, to enable the subordinate entry to be readily accessed. Similarly, each key in internal references within the data is translated and saved (thereby enabling ready access of the internal reference).

Each request handler 405-408 can be capable of accepting a request from a client 401-404 using a corresponding UDDI version. A request handler 405-408 receiving such a request may pass the requests to the data repository 409.

The data repository 409 can process requests in any supported UDDI version by cross-referencing the unique identifier keys of the requests with the associated unique identifier keys 411-414 for the objects 410 stored in the data repository.

The data repository can generate a response for a request. The response may contain a response object and/or one or more unique identifier keys. According to one embodiment of the present disclosure, the response may include a unique identifier key for each version of the UDDI standard that is supported by the repository 409. The responses may conform to the current UDDI version that the object 410 have been written in (the native UDDI version), here Version 3. While responses to the native version requests may be sent directly to the Version 3 request handler 407, responses to other requests can be sent to converters 415-418 which convert the responses into the UDDI version corresponding to the UDDI version that the request conforms to.

One converter (415-418) can be used for each supported UDDI version. However, it may not be necessary to use the converters 415-418 to convert responses where the version of the request is the native UDDI version. In addition, the converter 415-418 may be used to remove superfluous associated identifier keys from the response. The converters 415-418 may receive a response that includes identifier keys 411-414 for all supported UDDI versions. The converter 415-418 can then select the key corresponding to the version of the request. The converter 415-418 may then send the response object along with the selected key to the corresponding request handler 405-408.

For example, a client 401 using UDDI Version 1 can send a request. The UDDI Version 1 request handler 405 can receive this request and present it to the repository 409. The repository can determine that a data object 410 stored within the repository 409 is suitable for use as a response to the request based on the UDDI Version 1 key 411 that is associated with the data object 410. The repository can then send the data object 410 along with all of the keys associated with it as a response. This response can be sent to a UDDI Version 1 converter 415. The UDDI Version 1 converter 415 may select the UDDI Version 1 411 key from the response and sends the UDDI Version 1 key 411 along with the data object 410 to the UDDI Version 1 request handler 405. The UDDI Version 1 request handler may then send the UDDI Version 1 key 411 along with the data object 410 to the client 401 who made the request.

The converters 415-418 can also have the functionality of converting data.

Data entries in some instances may need to be translated to the most current, comprehensive form (for example, version 3), and stored with any missing data (for example, some data fields specified in version 3 which do not exist in earlier versions 1 and 2 may be set to default values).

For requests for older versions of the data, the most current form of the data is back-translated, dropping any extra data and reformatting it into an older form of the standard. For example, a find request for version 3 has additional search options, and different defaults, as compared to a find request in version 2.

Additionally, search results returned are different between the versions. All of the data may be stored in the repository in version 3 format, but are converted into version 2 format when responding to a version 2 find or get request. Similarly, a version 2 publication request supply version 2 data that are converted into version 3 before being stored in the repository. Any keys in the data are converted, and any differences in the data accommodated (for example, dropping excess data).

When a data entry is to be written, all of the possible versions of the keys within that entry are included. The data content is converted to UDDI v3 format, if required, and then the entry and any children (or subordinates) are written to the repository.

There may be a number of keys in a data object. In addition to the key which identifies the data entry, there are keys of its subordinate entries, tModel keys for keyed references, and keys in the keyvalue fields of keyed references which take entity keys as values (for example, identified by their tModel keys). Each of the keyed references can be stored in the various possible formats (for example, in v3 format, with v3 tModel key, and possibly v3 data; in v2 format, with v2 tModel key and possibly v2 data; if any future version requires yet another format, then it is stored also). Storing each format as a search string facilitates the speed of indexed access for all versions.

Store all possible versions of the data makes searching straightforward. The data provided, without conversion between versions, is searched for. Data in the search results may need to be converted. The data for return is in UDDI version 3 format, so that responding to version 3 inquiries is easy, the data is returned without conversion. For inquiries from version 2 clients, the data is converted from version 3 into version 2. This is essentially the reverse of the process discussed above. If necessary, each V3 key can be looked up, and the corresponding V2 key is returned. In many instances, these keys are cached, or obtained directly from the stored object.

Figure 5:
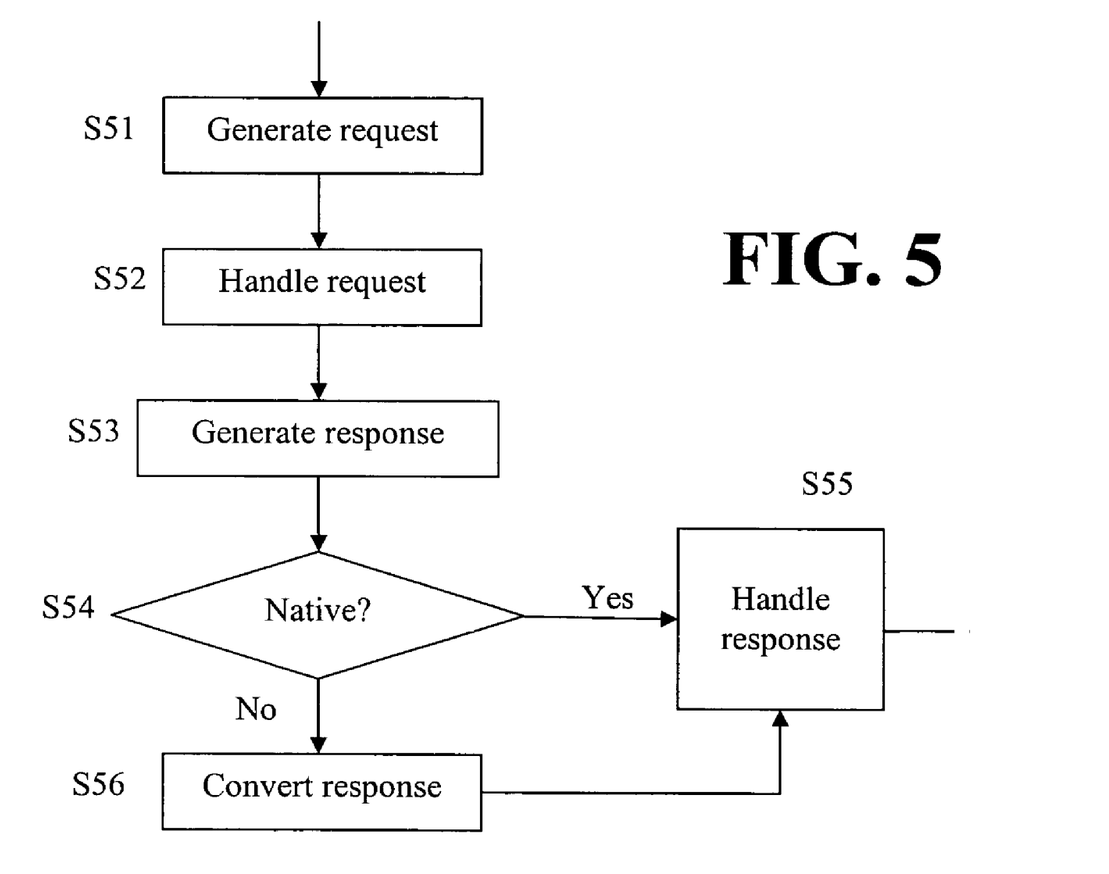
FIG. 5 is a flow chart illustrating the handling of a UDDI request according to an embodiment of the present disclosure.

A method for handling a UDDI request, according to an exemplary embodiment (FIG. 5), is discussed below. A client generates a request (Step S51). For example, this request may be to identify a particular web service corresponding to an object stored in a UDDI repository. The request may conform to a particular version of the UDDI standards. The request may be handled by a request handler that is set up to handle requests conforming to the particular version of the UDDI standards (Step S52) Handling of the request may include passing the request to the UDDI repository. The UDDI repository may generate a response based on the request (Step S53). For example, the response may include information pertaining to the particular web service. If the version of the UDDI standards to which the response conforms (that is, the native version) is the same version as the particular version of the UDDI standards to which the request conforms (Step S54, Yes), then the response may be handled by the request handler (Step S55). If the native version is not the same as the particular version of the UDDI standards to which the request conforms (Step S54, No), then the response may be converted by a converter (Step S56) and the response is handled by the request handler (Step S55). Handling of the response may include passing the response back to the client that sent the request.

The specific embodiments described herein are illustrative, and many additional modifications and variations can be introduced on these embodiments without departing from the spirit of the disclosure or from the scope of the appended claims. For example, elements (such as steps) and/or features of different illustrative embodiments may be combined with each other and/or substituted for each other within the scope of this disclosure and appended claims.

Additional variations may be apparent to one of ordinary skill in the art from reading U.S. provisional application Ser. No. 60/573,542, filed May 21, 2004, and U.S. provisional application Ser. No. 60/573,597, filed May 21, 2004, the entire contents of each of which are incorporated herein by reference.

What is claimed is:

1. A method for supporting multiple versions of web services standards, said method comprising:
   receiving a data entry to be stored in a repository, the data entry received in a version of a web services standard that is older than a most current version of the web services standard;
   converting the data entry in the older version to conform to the most current version of the web services standard; and
   in response to receiving the data entry in the older version of the web services standard, storing a data object in a repository, the data object comprising:
      the data entry as converted to the most current version of the web services standard; and
      a plurality of unique identifier keys for the data entry, the plurality of unique identifier keys comprising a current version unique identifier key and at least one previous version unique identifier key such that the data entry is directly accessible using either of the current version unique identifier key and the at least one previous version unique identifier key;
   receiving a request for the data entry, the request conforming to the older version; and
   generating a response to the request, the response to the request comprising:
      the data entry; and
      the plurality of unique identifier keys for the data entry, wherein each of said plurality of unique identifier keys conforming to a respective version of the web services standard, each version of the web services standard requiring a specific method for generating a unique identifier key in accordance with the respective version.

2. The method of claim 1, wherein the data object stored in the repository includes a plurality of keys for a subordinate entry associated with the data entry, said plurality of subordinate entry keys conforming to respective versions of the web services standard.

3. The method of claim 1, wherein the data object stored in the repository includes a plurality of keys for an internal reference in the data entry, said plurality of internal reference keys conforming to respective versions of the web services standard.

4. The method of claim 1, wherein the data entry is included in a request conforming to the older version, and data to be included in a response to the request is converted from the most current version of the web services standard to the older version.

5. The method of claim 1, wherein the received data entry is included in a publication request.

6. The method of claim 1, further comprising:
receiving a data request in a version of the web services standard other than the most current version; and
converting the request to the most current version.

7. The method of claim 6, further comprising:
searching the repository in response to the data request; and
converting a result of the search to conform to the data request version.

8. A computer system comprising:
a processor; and
a program storage device readable by the computer system, tangibly embodying a program of instructions executable by the processor to:
receive a data entry to be stored in a repository, the data entry received in a version of a web services standard that is older than a most current version of the web services standard;
convert the data entry in the older version to conform to the most current version of the web services standard; and
in response to receiving the data entry in the older version of the web services standard, store a data object in a repository, the data object comprising:
the data entry as converted to the most current version of the web services standard; and
a plurality of unique identifier keys for the data entry, the plurality of unique identifier keys comprising a current version unique identifier key and at least one previous version unique identifier key such that the data entry is directly accessible using either of the current version unique identifier key and the at least one previous version unique identifier key;
receive a request for the data entry, the request conforming to the older version; and
generate a response to the request, the response to the request comprising:
the data entry; and
the plurality of unique identifier keys for the data entry,
wherein each of said plurality of unique identifier keys conforming to a respective version of the web services standard, each version of the web services standard requiring a specific method for generating a unique identifier key in accordance with the respective version.

9. A non-transitory program storage device readable by a machine, tangibly embodying a program of instructions executable by the machine to:
receive a data entry to be stored in a repository, the data entry received in a version of a web services standard that is older than a most current version of the web services standard;
convert the data entry in the older version to conform to the most current version of the web services standard; and
in response to receiving the data entry in the older version of the web services standard, store a data object in a repository, the data object comprising:
the data entry as converted to the most current version of the web services standard; and
a plurality of unique identifier keys for the data entry, the plurality of unique identifier keys comprising a current version unique identifier key and at least one previous version unique identifier key such that the data entry is directly accessible using either of the current version unique identifier key and the at least one previous version unique identifier key;
receive a request for the data entry, the request conforming to the older version; and
generate a response to the request, the response to the request comprising:
the data entry; and
the plurality of unique identifier keys for the data entry,
wherein each of said plurality of unique identifier keys conforming to a respective version of the web services standard, each version of the web services standard requiring a specific method for generating a unique identifier key in accordance with the respective version.

10. An apparatus for supporting multiple versions of web services standards, comprising:
a data handler comprising a processor configured to:
receive a data entry to be stored in a repository comprising a memory, the data entry received in a version of a web services standard older than a most current version of the web services standard;
a converter configured to convert the data entry in the older version received by the data handler to conform to the most current version of the web services standard, standard; and
wherein the data handler is further operable to store the data entry as a data object in the repository comprising the memory, the data object comprising:
the data entry as converted to the most current version of the web services standard; and
a plurality of unique identifier keys for the data entry, the plurality of unique identifier keys comprising a current version unique identifier key and at least one previous version unique identifier key such that the data entry is directly accessible using either of the current version unique identifier key and the at least one previous version unique identifier key,
wherein the data handler is further operable to:
receive a request for the data entry, the request conforming to the older version; and
generate a response to the request, the response to the request comprising the data entry and the plurality of unique identifier keys for the data entry;
wherein each of the unique identifier keys conform to a respective version of the web services standard, each version of the web services standard requiring a specific method for generating a unique identifier key in accordance with the respective version.

11. The apparatus of claim 10, wherein the data object stored in the repository includes a plurality of keys for a subordinate entry associated with the data entry, and the subordinate entry keys conform to respective versions of the web services standard.

12. The apparatus of claim 10, wherein the data object stored in the repository includes a plurality of keys for an internal reference in the data entry, and the internal reference keys conform to respective versions of the web services standard.

13. The apparatus of claim 10, wherein the data entry is included in a request conforming to the older version, and data to be included in a response to the request is converted from the most current version of the web services standard to the older version.

14. The apparatus of claim 10, wherein the data handler receives a data request in a version of the web services standard other than the most current version, and the converter converts the data request to the most current version.

15. The apparatus of claim 14, wherein the repository is searched in response to the converted request, and the converter converts a result of the search to conform to the data request version.

16. A method for supporting multiple versions of a web services standard, comprising:
maintaining a repository storing a data object for a data entry, the data object comprising:
the data entry as converted to a most current version of the web services standard; and
a plurality of unique identifier keys for the data entry, the plurality of unique identifier keys comprising a current version unique identifier key and at least one previous version unique identifier key, each unique identifier key conforming to a respective version of a web services standard, each version of the web services standard requiring a specific method for generating a unique identifier key in accordance with the respective version;
receiving a request conforming to a version of the web services standard older than a most current version of the web services standard;
selecting a particular one of a plurality of request handlers to receive the request, each of the plurality of request handlers configured to handle requests conforming to a specific one of a plurality of versions, the selection of the particular request handler based on the ability of the particular request handler to handle the request conforming to the older version of the web services standard;
distributing the request conforming to the older version of the web services standard to the first request handler in response to receiving the request conforming to the older version of the web services standard;
converting the request to the most current version;
searching a repository in accordance with the converted request; and
generating a response to the received request, the response comprising:
the data entry in the current version of the web services standard; and
the plurality of unique identifier keys for the data entry.

17. An apparatus for supporting multiple versions of web services standards, comprising:
a repository of one or more data objects, each data object comprising:
a data entry as converted to a most current version of the web services standard; and
a plurality of unique identifier keys for the data entry, the plurality of unique identifier keys comprising a current version unique identifier key and at least one previous version unique identifier key, each of the plurality of unique identifier keys conforming to a respective version of a web services standard, each version of the web services standard requiring a specific method for generating a unique identifier key in accordance with the respective version;
a plurality of request handlers, each of the plurality of request handlers configured to handle requests conforming to a specific one of a plurality of versions, a selected one of the plurality of request handlers configured to receive a request conforming to a version of the web services standard older than a most current version of the web services standard, and generate a response in the older version to the request;
a converter configured to convert the request to the most current version, communicate the converted request to the repository and communicate the search result to the request handler,
wherein the request handler uses the result to generate the response to the received request, the response comprising:
the data entry in the current version of the web services standard; and
the plurality of unique identifier keys for the data entry.

18. The method of claim 1, wherein converting the data entry in the older version to conform to the most current version of the web services standard comprises:
converting a unique identifier key conforming to the older version of the web services standard to a unique identifier key conforming to the most current version of the web services standard.

19. The apparatus of claim 10, wherein when converting the data entry in the older version to conform to the most current version of the web services standard, the converter converts a unique identifier key conforming to the older version of the web services standard to a unique identifier key conforming to the most current version of the web services standard.

20. The method of claim 1, further comprising:
maintaining a plurality of request handlers, each request handler operable to receive a selected one of the multiple versions of web services standards;
receiving a request conforming the older version, the request including a unique identifier key conforming to the older version; and
distributing the request to a particular request handler operable to receive the request conforming to the older version.

21. The method of claim 20, further comprising:
converting, by the particular request handler, the unique identifier key conforming to the older version to a unique identifier key conforming the current version; and
transmitting the unique identifier key conforming to the current version from the particular request handler to the repository.

22. The method of claim 20 further comprising:
receiving, by the particular request handler, a response to the request from the repository, the response to the request comprising:
the data entry in the current version of the web services standard; and
the plurality of unique identifier keys for the data entry; and
converting, by the particular request handler, the data entry from the current version to the older version.

23. The computer system of claim 8, wherein the program of instructions is further executable by the processor to:
maintain a plurality of request handlers, each request handler operable to receive a selected one of the multiple versions of web services standards;
receive a request conforming the older version, the request including a unique identifier key conforming to the older version; and
distribute the request to a particular request handler operable to receive the request conforming to the older version.

24. The computer system of claim 23, wherein the program of instructions is further executable by the processor to:
convert, by the particular request handler, the unique identifier key conforming to the older version to a unique identifier key conforming the current version; and transmit the unique identifier key conforming to the current version from the particular request handler to the repository.

25. The computer system of claim 23, wherein the program of instructions is further executable by the processor:
   receive, by the particular request handler, a response to the request from the repository, the response to the request comprising:
      the data entry in the current version of the web services standard; and
      the plurality of unique identifier keys for the data entry; and
   convert, by the particular request handler, the data entry from the current version to the older version.

26. The program storage device of claim 9, wherein the program of instructions is further executable by the machine to:
   receive a request conforming to the older version, the request including a unique identifier key conforming to the older version; and
   distribute the request to a particular one of a plurality of request handlers, each request handler operable to receive a selected one of the multiple versions of web services standards, the particular one of the request handlers configured to receive the request conforming to the older version.

27. The program storage device of claim 26, wherein the program of instructions is further executable by the machine to:
   convert, by the particular request handler, the unique identifier key conforming to the older version to a unique identifier key conforming the current version; and
   transmit the unique identifier key conforming to the current version from the particular request handler to the repository.

28. The program storage device of claim 26, wherein the program of instructions is further executable by the processor:
   receive, by the particular request handler, a response to the request from the repository, the response to the request comprising:
      the data entry in the current version of the web services standard; and
      the plurality of unique identifier keys for the data entry; and
   convert, by the particular request handler, the data entry from the current version to the older version.

29. The apparatus of claim 10, wherein the data handler is further configured to:
   receive a request conforming the older version, the request including a unique identifier key conforming to the older version; and
   convert the unique identifier key conforming to the older version to a unique identifier key conforming the current version; and
   transmit the unique identifier key conforming to the current version from the request handler to the repository;
   receive the response to the request from the repository, the response to the request comprising:
      the data entry in the current version of the web services standard; and
      the plurality of unique identifier keys for the data entry; and
   convert the data entry from the current version to the older version.

* * * * *